United States Patent
Lin et al.

(10) Patent No.: US 8,488,065 B2
(45) Date of Patent: Jul. 16, 2013

(54) WIRELESS TRANSMISSION DISPLAY SYSTEM AND WIRELESS TRANSMISSION DISPLAYING METHOD

(75) Inventors: Huang-Ti Lin, Hsin-Chu (TW); Yen-Feng Lu, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 6 days.

(21) Appl. No.: 13/246,922

(22) Filed: Sep. 28, 2011

(65) Prior Publication Data

US 2012/0169926 A1 Jul. 5, 2012

(30) Foreign Application Priority Data

Dec. 30, 2010 (TW) .............................. 99147045 A

(51) Int. Cl.
 *H04N 5/44* (2011.01)
(52) U.S. Cl.
 USPC ............................ 348/725; 348/441; 348/723
(58) Field of Classification Search
 USPC ......... 348/723, 725–726, 411, 558, 553–555; 455/566, 145, 557, 556.1, 151.2, 154.2, 158.4, 455/158.5, 575.1, 550.1, 186.1, 422.1, 344; 345/156, 204
 IPC ....................................................... H04N 5/44
 See application file for complete search history.

(56) References Cited

U.S. PATENT DOCUMENTS

| | | | | |
|---|---|---|---|---|
| 2003/0017846 | A1* | 1/2003 | Estevez et al. | 455/556 |
| 2005/0289631 | A1* | 12/2005 | Shoemake | 725/118 |
| 2007/0167188 | A1 | 7/2007 | Linden | |
| 2009/0267952 | A1 | 10/2009 | Yan et al. | |
| 2010/0141613 | A1 | 6/2010 | Sonobe | |

FOREIGN PATENT DOCUMENTS

| | | |
|---|---|---|
| CN | 1788489 | 6/2006 |
| CN | 101076100 | 11/2007 |

* cited by examiner

*Primary Examiner* — Trang U Tran
(74) *Attorney, Agent, or Firm* — WPAT, PC; Justin King

(57) ABSTRACT

An exemplary wireless transmission display system includes a signal generating apparatus and at least one display apparatus. The signal generating apparatus receives a display data represented in a first data format and converts the display data to be represented in a second data format. Then, the display data represented in the second data format is transmitted to the display apparatus in wireless manner. The display apparatus receives the display data represented in the second data format and performs a display directly according to the display data represented in the second data format without converting the second data format into any other data format. Moreover, a wireless transmission displaying method is also provided.

9 Claims, 3 Drawing Sheets

WIRELESS TRANSMISSION DISPLAY SYSTEM AND WIRELESS TRANSMISSION DISPLAYING METHOD

TECHNICAL FIELD

The disclosure relates to display systems and displaying method, and more particularly to a display system embedded with wireless transmission function and a wireless transmission displaying method.

BACKGROUND

With the development of science and technology, functions of display apparatus are becoming more and more diversified. Nowadays, display apparatus combined with wireless transmission apparatus have evolved into a mainstream of further household televisions owing to their wireless advantage.

FIG. 1 is a schematic view of a conventional wireless transmission display system. As depicted in FIG. 1, the conventional wireless transmission display system 100 includes a media source 110, a wireless transmitter 114, a wireless receiver 132 and a television (TV) set 130. The media source 110 includes a signal processor 112. The TV set 130 includes a system signal adjustment module 134 and a panel module 137. The panel module 137 includes a panel signal processor/timing control unit 135 and a display panel 136. The signal processor 112 receives a display signal 160 transmitted from a computer or a cable TV service provider and transform the received display signal 160 to a high definition multimedia interface (HDMI) format transmission signal 170. The wireless transmitter 114 delivers the HDMI format transmission signal 170 in wireless transmission manner to the wireless receiver 132. Subsequently, the system signal adjustment module 134 in the TV set 130 transforms the HDMI format transmission signal 170 to a low voltage differential signaling (LVDS) format signal 180 and inputs the LVDS format signal 180 into the panel module 137 for providing display data. However, the wireless transmission display system 100 necessarily needs the system signal adjustment module 134 for signal transformation, which is a burden of operation time and manufacturing cost for the display system 100.

SUMMARY OF DISCLOSURE

Accordingly, a wireless transmission display system in accordance with an embodiment of the disclosure includes a signal generating apparatus and at least a display apparatus. The signal generating apparatus receives a display data represented in a first data format, converts the received display data represented in the first data format to be represented in a second data format, and transmits out the display data represented in the second data format in wireless transmission manner. The display apparatus receives the display data represented in the second data format in wireless transmission manner and performs a display on the display apparatus according to the received display data. Moreover, the display apparatus directly uses the display data represented in the second data format to control the display result of the display apparatus without converting the display data represented in the second data format to be represented in any other data format for display.

A wireless transmission display apparatus in accordance with another embodiment of the disclosure includes at least a display apparatus. The display apparatus receives display data from a signal generating unit in wireless transmission manner and performs a display on the display apparatus according to the received display data. Moreover, the display apparatus directly uses the received display data to control the display result of the display apparatus without performing format conversion for display applied to the received display data.

A wireless transmission displaying method in accordance with still another embodiment of the disclosure includes the following steps of: receiving a display data represented in a first data format; converting the display data represented in the first data format to be represented in a second data format; transmitting the display data represented in the second data format in wireless transmission manner; receiving the display data represented in the second data format in wireless transmission manner; and using the received display data represented in the second data format to control a display of a display apparatus with performing any data format conversion to the display data represented in the second data format.

BRIEF DESCRIPTION OF THE DRAWINGS

The above embodiments of the disclosure will become more readily apparent to those ordinarily skilled in the art after reviewing the following detailed description and accompanying drawings, in which.

DETAILED DESCRIPTION OF EMBODIMENTS

The disclosure will now be described more specifically with reference to the following embodiments. It is to be noted that the following descriptions of embodiments are presented herein for purpose of illustration and description only. It is not intended to be exhaustive or to be limited to the precise form disclosed.

Figure 2:
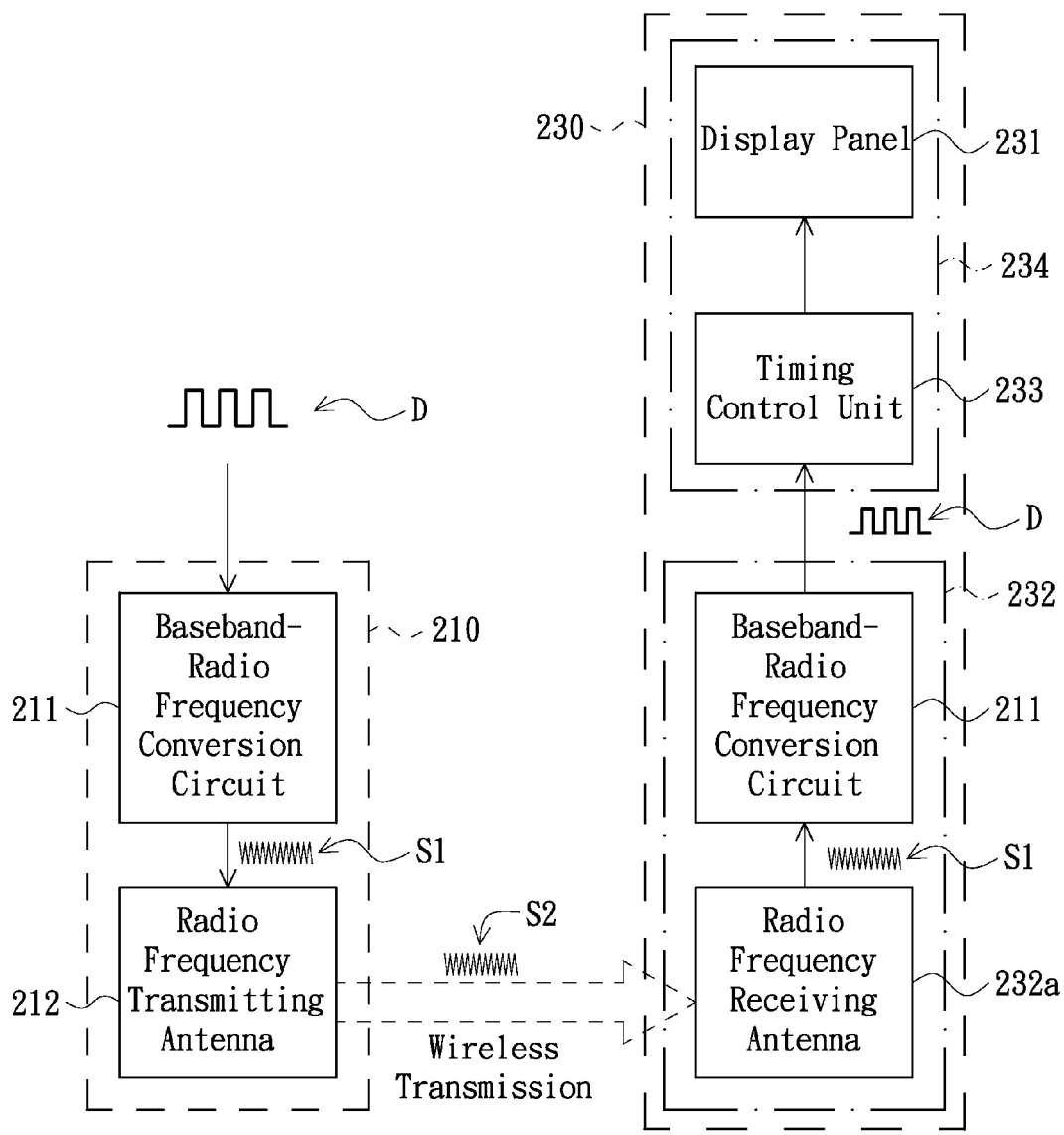
FIG. 2 is a schematic view of a wireless transmission display system in accordance with an embodiment of the disclosure.

Referring to FIG. 2, a schematic view of a wireless transmission display system in accordance with an embodiment of the disclosure is shown. As depicted in FIG. 2, the wireless transmission display system 200 includes a signal generating apparatus 210 and at least one display apparatus 230. In the exemplary embodiment as illustrated in FIG. 2, only one display apparatus 230 is shown for the purpose of illustration. In particular, the signal generating apparatus 210 receives a display data D and thereby transmits out the received display data D in wireless transmission manner. The display apparatus 230 receives the display data D from the signal generating apparatus 210 in wireless transmission manner and performs a display according to the received display data D. In the illustrative embodiment, the display apparatus 230 directly uses the received display data D to control the display result of the display apparatus 230 without performing data format conversion to the received display data D for display.

More specifically, the signal generating apparatus 210 includes a baseband-radio frequency conversion circuit 211 and a radio frequency transmitting antenna 212. The baseband-radio frequency conversion circuit 211 converts the display data D in baseband mode to a corresponding radio frequency signal S1. The radio frequency transmitting antenna 212 is electrically/electronically coupled to the baseband-radio frequency conversion circuit 211 to receive and thereby transmit out the radio frequency signal S1 carried by the signal S2. The baseband-radio frequency conversion circuit 211 for example includes a frequency boosting circuit and a power amplifier, but not to limit the disclosure. The frequency boosting circuit transforms the display data from the mode of baseband signal to another mode of radio frequency signal S1, so as to avoid the interference of external factor. The power amplifier is for increasing the strength of the radio frequency signal S1, so as to assure the display apparatus 230 in a certain range can effectively receive the radio frequency signal S1 carried by the signal S2.

The display apparatus 230 includes a wireless receiving unit 232 and a panel module 234. The panel module 234 includes a display panel 231 and a timing control unit 233. The display panel 231 for example is a liquid crystal display panel, but not to limit the disclosure. The wireless receiving unit 232 receives the display data D transmitted from the signal generating apparatus 210 in wireless transmission manner. The timing control unit 233 of the panel module 234 is electrically coupled to the wireless receiving unit 232 and directly uses the received display data D to control the display panel 231 for corresponding display operation. The timing control unit 233 may be re-designed according to the type of display panel 231.

The wireless receiving unit 232 includes a radio frequency receiving antenna 232a and a baseband-radio frequency conversion circuit 211. Herein, it is noted that the baseband-radio frequency conversion circuit 211 in the wireless receiving unit 232 and the baseband-radio frequency conversion circuit 211 in the signal generating apparatus 210 are given the same numerical reference only for illustrating they may have the same structure. The radio frequency receiving antenna 232a receives the display data D carried by the radio frequency signal S2 in wireless transmission manner and outputs the radio frequency signal S1. The baseband-radio frequency conversion circuit 211 in the wireless receiving unit 232 retrieves the display data D from the mode of radio frequency signal S1 carried by the signal S2. The baseband-radio frequency conversion circuit 211 in the wireless receiving unit 232 for example includes a frequency down circuit, but not to limit the disclosure.

A process of the display data D inputting to the signal generating apparatus 210 and then transmitting in wireless transmission manner to the display apparatus 230 for display will be described as follows: the signal generating apparatus 210 receives the display data D and transforms the received display data D in baseband mode to be a corresponding radio frequency signal S1 by the baseband-radio frequency conversion circuit 211. The radio frequency transmitting antenna 212 receives the radio frequency signal S1 and transmits out the received radio frequency signal 51 carried by the signal S2. Subsequently, the radio frequency receiving antenna 232a in the wireless receiving unit 232 receives the radio frequency signal S1 carried by the signal S2, and then the display data D carried in the radio frequency signal S1 is retrieved by the baseband-radio frequency conversion circuit 211 from the radio frequency signal S1. Afterwards, the timing control unit 233 of the panel module 234 directly uses the display data D in the mode of baseband signal to control the display panel 231, so as to perform a corresponding display operation.

Since the display apparatus 230 is no longer needed to convert the display data D into other data format for display after receiving the display data D, the time of data format conversion can be saved and the hardware cost is reduced.

Figure 3:
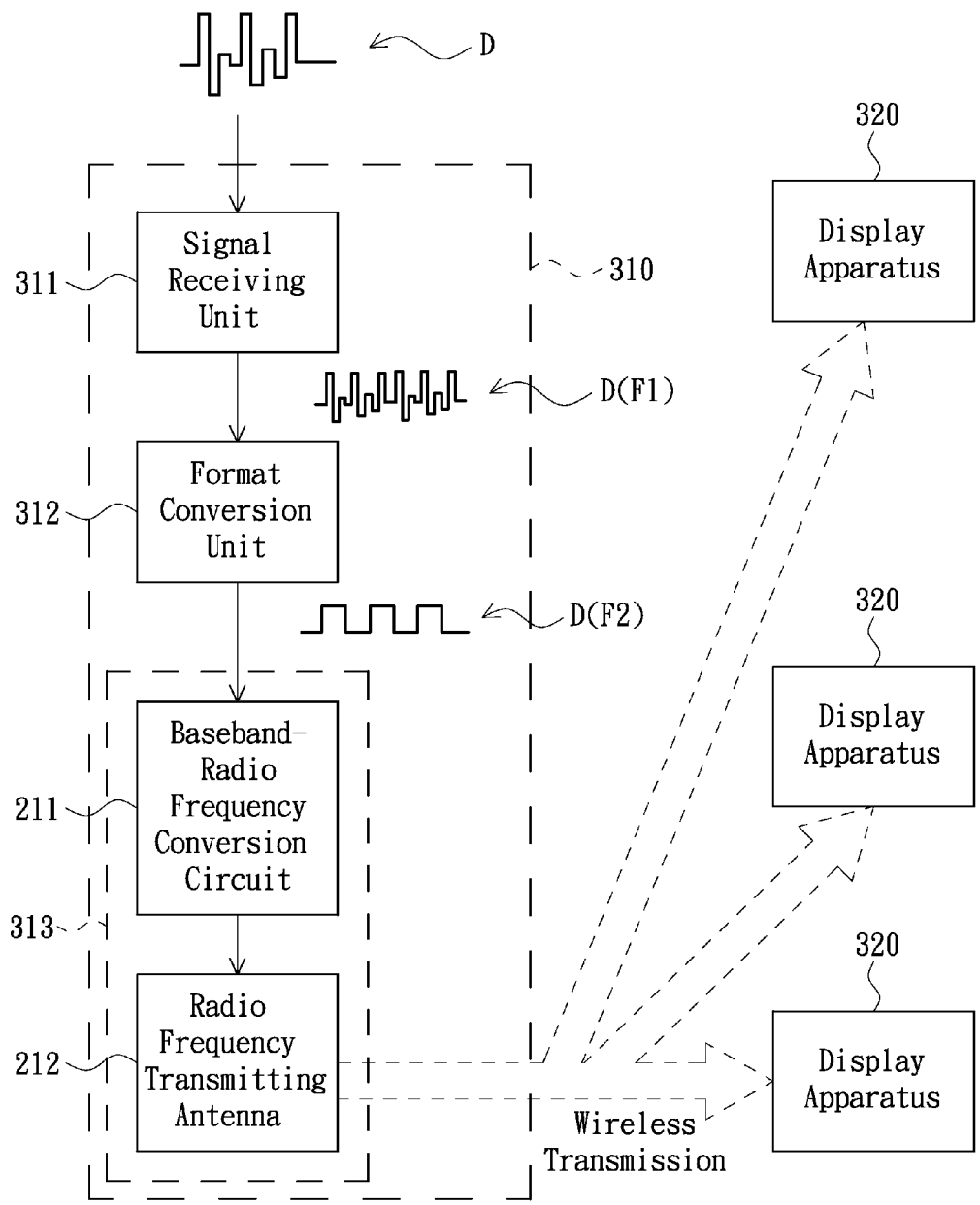
FIG. 3 is a schematic view of a wireless transmission display system in accordance with another embodiment of the disclosure.

FIG. 3 shows a schematic view of a wireless transmission display system in accordance with another embodiment of the disclosure. As depicted in FIG. 3, the wireless transmission display system 300 includes a signal generating apparatus 310 and at least one display apparatus 320. In the exemplary embodiment associated with FIG. 3, three display apparatus 320 are shown for the purpose of illustration. The difference of the wireless transmission display system 300 with respect to the above wireless transmission display system 200 is that the signal generating apparatus 310 has a different internal structure from that of the signal generating apparatus 210, so as to apply the situation that the data format of the display data D received by the signal generating apparatus 310 is different from a data format of the display data required by the display apparatus 320 to control a display module in the display apparatus 320.

In particular, the signal generating apparatus 310 receives the display data D represented in a first data format D(F1), converts the received display data D represented in the first data format D(F1) to be represented in a second data format D(F2) and transmits out the display data D represented in the second data format D(F2) in wireless transmission manner. The first data format D(F1) for example is a data format provided by a cable TV service provider, and the second data format D(F2) for example is a data format accorded with low voltage differential signaling (LVDS) standard, but in other embodiment, the first data format D(F1) and the second data format D(F2) may be other data formats instead. In addition, each the display apparatus 320 receives the display data D represented in the second data format D(F2) and directly uses the received display data D represented in the second data format D(F2) to control a display result of the display apparatus 320 without converting the display data D represented in the second data format D(F2) to be represented in any other data format for display.

The signal generating apparatus 310 includes a signal receiving unit 311, a format conversion unit 312 and a wireless transmitting unit 313. The format conversion unit 312 is electrically coupled to the signal receiving unit 311, and the wireless transmitting unit 313 is electrically coupled to the format conversion unit 312. Specifically, the signal receiving unit 311 receives the display data D represented in the first data format D(F1). The format conversion unit 312 receives the display data D represented in the first data format D(F1) provided from the signal receiving unit 311, and converts the display data D represented in the first data format D(F1) to be represented in the second data format D(F2). Moreover, the wireless transmitting unit 313 receives the display data D represented in the second data format D(F2) provided from the format conversion unit 312 and transmits out the display data D represented in the second data format D(F2) in wireless transmission manner, e.g., carried by radio frequency signal. The format conversion unit 312 for example is a signal processor, but not limited to this, and may be a central processor or a micro-processor instead.

Figure 1:
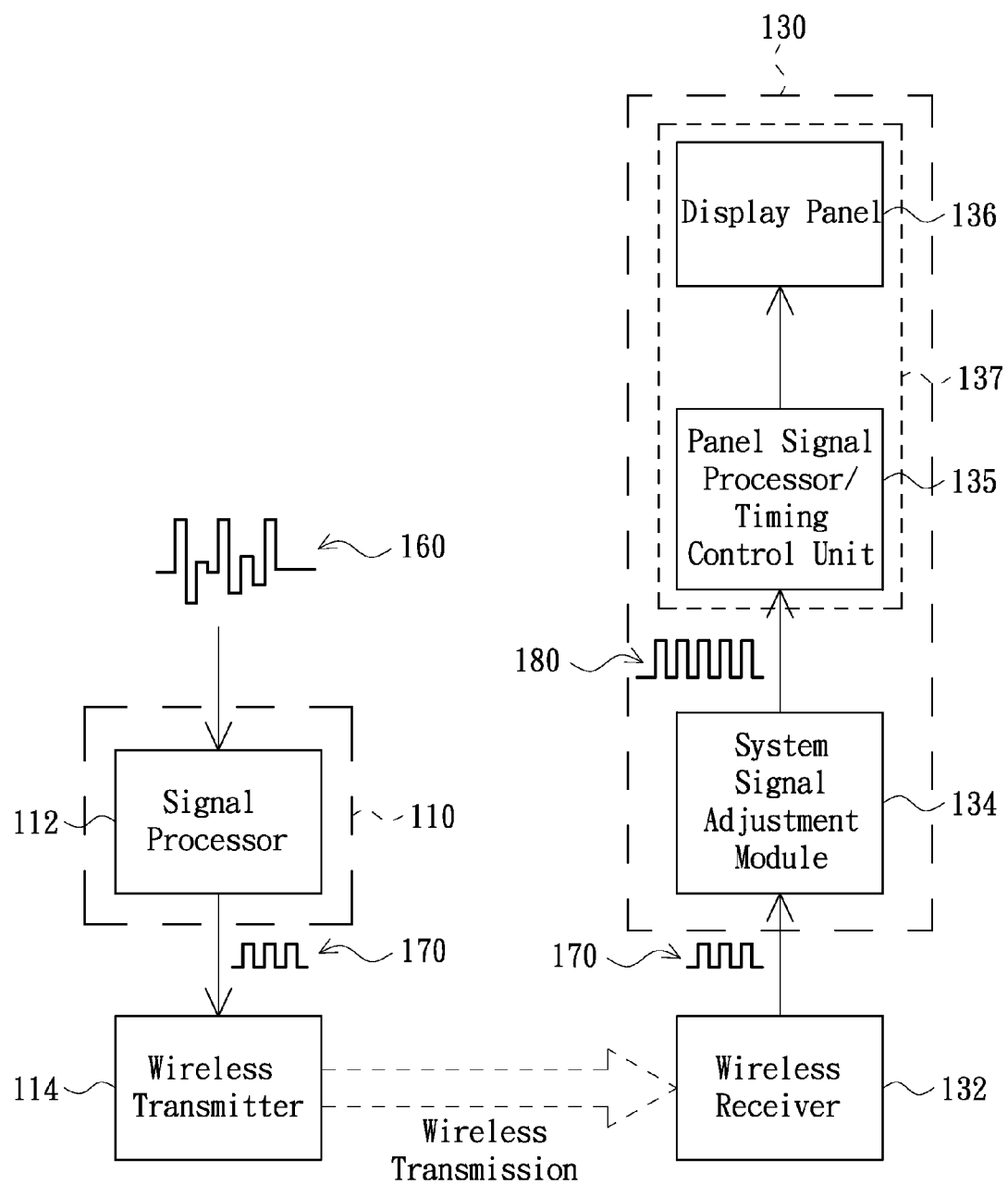
FIG. 1 is a schematic view of a conventional wireless transmission display system.

Specifically, the wireless transmitting unit 313 for example includes a baseband-radio frequency conversion circuit 211 and a radio frequency transmitting antenna 212, and an operation principle thereof is the same as that in the embodiment associated with FIG. 2 and thus will be omitted. Furthermore, each the display apparatus 320 in the wireless transmission display system 300 has a similar internal structure and operation principle to that of the display apparatus 230, and thus will not be described in detail. In addition, it is indicated that, in the present embodiment, the multiple display apparatus 320 can receive the display data D represented in the second data format D(F2) from the same signal generating apparatus 310 and directly use the display data D represented in the second data format D(F2) to control the display results of the respective display apparatus 320 without converting the received display data D represented in the second data format D(F2) to be represented in any other data format for display. Accordingly, besides the saving of time for data format conversion, since each display apparatus 320 is no longer needed to be equipped with the system signal adjustment module as shown in FIG. 1, the hardware cost can be reduced consequently. Furthermore, the more of the display apparatus 320, the more cost is reduced.

Besides, the signal generating apparatus 310 further can be equipped with a multiplexer, so that different display apparatus 320 can receive different display data D from the same signal generating apparatus 310.

Sum up, in the exemplary wireless transmission display system of the disclosure, since the display apparatus is no longer needed to convert the data format of the display data and therefore directly uses the display data to control the display result on the display apparatus, so that the display apparatus is simplified and the time of data format conversion is saved. Besides, in the exemplary wireless transmission display system, since the display data format transmitted from the signal generating apparatus is identical to the data format of the display data for controlling the display module, the display apparatus is not necessarily to be equipped with the system signal adjustment module, the hardware and operation architecture of the wireless transmission display system can be simplified and therefore the cost of the wireless transmission display system is reduced.

While the invention has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless transmission display system comprising:
   a signal generating apparatus, receiving a display data represented in a first data format, converting the display data represented in the first data format to be represented in a second data format and transmitting out the display data represented in the second data format in wireless transmission manner; and
   at least a display apparatus, receiving the display data represented in the second data format in wireless transmission manner, and performing a display on the display apparatus according to the received display data, and including:
   a display panel;
   a wireless receiving unit, receiving the display data represented in the second data format carried by the radio frequency signal transmitted from the signal generating apparatus in wireless transmission manner; and
   a timing control unit, electrically coupled to the wireless receiving unit and directly using the display data represented in the second data format to control the display panel to perform a corresponding display operation,
   wherein the display apparatus directly uses the received display data represented in the second data format to control the display result on the display apparatus without converting the received display data represented in the second data format to be represented in any other data format for display.

2. The wireless transmission display system as claimed in claim 1, wherein the signal generating apparatus comprises:
   a signal receiving unit, receiving the display data represented in the first data format;
   a format conversion unit, electrically coupled to the signal receiving unit to receive the display data represented in the first data format and converting the display data represented in the first data format to be represented in the second data format; and
   a wireless transmitting unit, electrically coupled to the format conversion unit to receive the display data represented in the second data format and transmitting out the display data represented in the second data format in wireless transmission manner.

3. The wireless transmission display system as claimed in claim 2, wherein the wireless transmitting unit comprises:
   a baseband-radio frequency conversion circuit, converting the display data represented in the second data format into a radio frequency signal; and
   a radio frequency transmitting antenna, electrically coupled to the baseband-radio frequency conversion circuit to receive and transmit out the radio frequency signal.

4. The wireless transmission display system as claimed in claim 1, wherein the wireless receiving unit comprises:
   a radio frequency receiving antenna, receiving the display data represented in the second data format transmitted in wireless transmission manner and
   a baseband-radio frequency conversion circuit, converting the display data represented in the second data format from the radio frequency signal into a baseband signal.

5. A wireless transmission display apparatus comprising:
   at least a display apparatus, receiving display data from a signal generating unit in wireless transmission manner, performing a display on the display apparatus according to the received display data, and including:
   a display panel;
   a wireless receiving unit, receiving the display data represented in the second data format carried by the radio frequency signal transmitted from the signal generating apparatus in wireless transmission manner; and
   a timing control unit, electrically coupled to the wireless receiving unit and directly using the display data represented in the second data format to control the display panel to perform a corresponding display operation,
   wherein the display apparatus directly uses the display data to control the display result on the display apparatus without converting the data format of the display data after being received by the display apparatus.

6. The wireless transmission display apparatus as claimed in claim 5, wherein the signal generating unit comprises:
   a baseband-radio frequency conversion circuit, converting the display data into a radio frequency signal; and
   a radio frequency transmitting antenna, electrically coupled to the baseband-radio frequency conversion circuit to receive and thereby transmit out the radio frequency signal.

7. The wireless transmission display apparatus as claimed in claim 5, wherein the wireless receiving unit comprises:
   a radio frequency receiving antenna, receiving the display data transmitted in wireless transmission manner; and
   a baseband-radio frequency conversion circuit, converting the display data from a radio frequency signal mode into a baseband signal mode.

8. A wireless transmission displaying method comprising the steps of:
   receiving a display data represented in a first data format;
   converting the display data represented in the first data format to be represented in a second data format;
   transmitting the display data represented in the second data format in wireless transmission manner;

receiving the display data represented in the second data format transmitted in wireless transmission manner;

directly using the display data represented in the second data format to control the display panel to perform a corresponding display operation; and using the received display data represented in the second data format to control a display of a display apparatus without performing any data format conversion to the display data represented in the second data format.

9. The wireless transmission displaying method as claimed in claim 8, wherein the second data format is accorded with the low voltage differential signaling (LVDS) standard.

* * * * *